United States Patent Office 3,551,525
Patented Dec. 29, 1970

3,551,525
SURFACE COATING COPOLYMERS CONTAINING ETHERIFIED N-METHYLOLAMIDE
Hans Wilhelm, Heinsheim, Ernst Penning, Ludwigshafen, Klaus Gulbins and Heinrich Hartmann, Limburgerhof, and Ernst Wilhelm Hann, Ludwigshafen, Germany, assignors to Badische Anilin- & Soda-Fabrik Aktiengesellschaft, Ludwigshafen (Rhine), Germany
No Drawing. Filed Nov. 19, 1968, Ser. No. 777,174
Claims priority, application Germany, Nov. 24, 1967, 1,669,090
Int. Cl. C08f $15/40$
U.S. Cl. 260—881
6 Claims

ABSTRACT OF THE DISCLOSURE

Production of coating agents in which a mixture of copolymerizable olefinically unsaturated compounds which contains an etherified N-methylolamide of a copolymerizable olefinically unsaturated carboxylic acid is subjected to free-radical polymerization under conventional polymerization conditions in an organic liquid which contains dissolved therein a copolymer of olefinically unsaturated compounds and etherified N-methylolamides of copolymerizable olefinically unsaturated carboxylic acids.

---

The invention relates to coating compositions based on a dispersion of a copolymer containing etherified N-methylolamide groups as a binder.

It is known that copolymers of esters of acrylic and methacrylic acids, ethers of N-methylolacrylamide or N-methylolmethacrylamide and other monoolefinically unsaturated monomers such as monoesters of acrylic or methacrylic acid with polyhydric hydroxyl compounds, dissolved in an organic solvent, may be used as baking lacquers.

Surface coatings prepared from these compositions have the serious disadvantage that the solutions of the copolymers (which have a high molecular weight) are difficult to apply because of their high viscosity. If it is desired to make application easier, it is necessary to lower the molecular weight of the copolymers. For example, the solution polymer described in Example 1 of British patent specification No. 1,062,286, which can be used for coating purposes, has a K value of only 20. It has not hitherto been possible to use highly concentrated solutions of high molecular weight copolymers as surface coatings.

It is an object of this invention to prepare coating agents in organic liquids which have a high content of binder while having the lowest possible viscosity. Another object of the invention is the production of low viscosity, highly concentrated binders having a higher degree of polymerization so that not only do these coating agents have a favorable viscosity for application by conventional methods but also give coatings having improved properties, for example, improved elasticity.

According to this invention a process for the production of coating agents based on copolymers containing etherified N-methylolamide groups comprises polymerising a mixture (I) of:

(A) 50 to 95% by weight of at least one copolymerizable ester or a monoolefinicallc unsaturated carboxylic acid having three to five carbon atoms and an alcohol having one to four carbon atoms, (B) 0.75 to 25% by weight of an N-methylolamide of a copolymerizable olefinically unsaturated carboxylic acid having three to five carbon atoms which has been etherified with an alcohol having one to eight carbon atoms, and (C) 0.5 to 40% by weight of at least one further copolymerizable monoolefinically unsaturated monomer from the group of vinyl esters of monocarboxylic acids having two to eleven carbon atoms, of styrene, of vinyltoluene, of acrylic acid, methacrylic acid, acrylamide, methacrylamide, acrylonitrile, methacrylonitrile, hemiesters of alkanediols or oxaalkanediols having two to six carbon atoms with acrylic or methacrylic acid, N-vinylimidazole and N-vinylpyrrolidone, the sum of the percentages of $(A)+(B)+(C)$ being equal to 100, in an organic liquid in which is dissolved in an amount of from 10 to 200% by weight (with reference to mixture (I)) a copolymer (II) which contains polymerized units of:

(A) 50 to 97% by weight of at least one copolymerizable ester of a monoolefinically unsaturated carboxylic acid having three to five carbon atoms and an alcohol having four to eighteen carbon atoms, (B) 2 to 50% by weight of a N-methylolamide of a copolymerizable olefinically unsaturated carboxylic acid having three to five carbon atoms which has been etherified with an alcohol having one to eight carbon atoms, and (C) 0.5 to 48% by weight of at least one further copolymerizable monoolefinically unsaturated monomer from the group of styrene, vinyltoluene, acrylic acid, methacrylic acid, acrylamide, methacrylamide, monoesters of acrylic or methacrylic acid with alkanediols or alkanetriols having two to six carbon atoms, N-vinylpyrrolidone and N-vinylimidazole, the sum of the percentages of $(A)+(B)+(C)$ being equal to 100, in the presence of a conventional initiator forming free radicals under conventional polymerization conditions, the organic liquid containing at least 20% by weight of aliphatic or hydroaromatic hydrocarbons and the ratio of the sum of the amounts by weight of mixture (I)+copolymer (II) to the amount by weight of the organic liquid being within the range from 1:4 to 4:1.

The coating agents according to this invention are particularly distinguished by the fact that they have a high solids concentration of binder, a high molecular weight of the copolymer being achieved at the same time. The compositions according to the invention give coatings which have a number of additional valuable properties as compared with coatings prepared from conventional copolymers of the same type prepared by solution polymerization. These properties include elasticity, freedom from tackness and the like. Moreover, it is possible to lower the proportion of crosslinking components for subsequent crosslinking of the copolymer and thus to decrease the extent of crosslinking. In this way the coatings become much more elastic. The compositions give coatings having improved adherence and shock resistance and also outstanding resistance to hydrolysis. Furthermore, coatings can be obtained which have particularly good light fastness, flexural strength, solvent resistance, weather resistance and hardness as well as other properties.

The following may be said concerning the components making up the mixture (I):

(A) Esters of acrylic and/or methacrylic acid, such as methyl acrylate, methyl methacrylate, ethyl acrylate, tert.-butyl acrylate, or tert.-butyl methacrylate or mixtures of these esters with one another, are preferred as copolymerizable esters of monoolefinically unsaturated carboxylic acid having three to five carbon atoms and alcohols having one to four carbon atoms. The corresponding diesters of maleic, fumaric and itaconic acid are also suitable.

The amount and type of ester or ester mixture chosen depends on the purpose for which the coating agent is to be used. The monomers (A) should be contained in the mixture (I) in amounts of from 50 to 95% by weight and preferably in amounts of from 60 to 85% by weight.

(B) Suitable ethers of a N-methylolamide of a copolymerizable olefinically unsaturated carboxylic acid having three to five carbon atoms with an alcohol having one to eight carbon atoms, which may be contained in the mixture (I) in amounts of from 0.75 to 25% and particularly from 2.5 to 17.5% by weight, are for example ethers of N-methylolacrylamide, N - methylolmethacrylamide, N - methylolcrotonamide, or N - N' - dimethylolitaconamide with n-butanol, isobutanol, 2-ethylhexyl alcohol, benzyl alcohol or ethylene glycol monomethyl ether. The butyl ethers of N-methylolacrylamide and N-methylolmethacrylamide are preferred.

(C) The mixture (I) also contains 0.5 to 40% and particularly 0.5 to 25% by weight of at least one other monoolefinically unsaturated monomer. Examples are vinyl esters of monocarboxylic acids having two to eleven carbon atoms of which vinyl acetate, vinyl propionate, vinyl butyrate, vinyl pivalate and vinyl esters of carboxylic acids prepared by the reaction of olefins with carbon monoxide and water in the presence of sulfuric acid are suitable. Other suitable monomers are those which contain free hydroxyl groups, such as hemiesters of alkanediols and oxaalkanediols having two to six carbon atoms and acrylic or methacrylic acid, for example the monoacrylates and monomethacrylates of butanediol-1,4, pentanediol-1,5, propanediol - 1,2 or propanediol-1,3, ethylene glycol or diethylene glycol and also amides and/or nitriles of unsaturated carboxylic acids such as acrylamide, methacrylamide, acrylonitrile, methacrylonitrile, N-vinylamides and N-vinyllactams such as N-vinyl-N-methylacetamide, N-vinylpyrrolidone, or N-vinylcaprolactam. The use of some monoolefinically unsaturated carboxylic acids having three to five carbon atoms such as acrylic acid, methacrylic acid, itaconic acid, maleic acid, maleic anhydride or crotonic acid in an amount of up to 15% and particularly 0.5 to 5% by weight is very advantageous. Vinylaromatics such as styrene or vinyltoluene are also suitable monomers, but it should be remembered that the solubility of the polymer consisting of the mixture (I) in hydrocarbons may be increased by an increasing content of these monomers. The choice of the type and amount of the comonomers always depends on the intended application of the coating agents and the properties required for the coatings prepared therefrom.

The sum of the percentages of $(A)+(B)+(C)$ of the mixture (I) is 100.

Preferred mixtures (I) consist for example of 65 to 82% by weight of a methyl and/or ethyl acrylate and/or methacrylate, 5 to 17.5% by weight of an alkyl ether of N-methylolacrylamide or N-methylolmethacrylamide, 2 to 25% by weight of a monoacrylate or monomethacrylate of an alkanediol having two to four carbon atoms and 0.05 to 4% by weight of an unsaturated carboxylic acid of the said type.

Examples of organic liquids which contains at least 20% by weight of aliphatic or hydroaromatic hydrocarbons in which the mixture (I) is polymerized in the presence of a copolymer (II) are organic liquids which are liquid within a range of from $-20°$ to $+30°$ C. and have a boiling point of from 30° to 300° C., particularly from 80° to 200° C. These liquids include especially hydrocarbons of aliphatic or hydroaromatic nature and mixtures thereof with aromatic or araliphatic hydrocarbons, ketones, ethers or esters and mixtures thereof. Examples of very suitable hydrocarbons or mixing components are heptane, octane, nonane, cyclohexane, white spirit, gasoline, xylene mixtures, terpenes, and solvent naphthas of aromatic, aliphatic or naphthenic nature. Mixtures of these substances with each other are obviously also suitable. The decisive factor is that the copolymer containing etherified N-methylolamide groups formed in the organic liquid should be substantially insoluble therein. A certain small proportion of solvent which dissolves the copolymer formed from mixture (I) or has a swelling effect on this copolymer may however be present. The use of such a solvent permits the regulation of the viscosity of the copolymer dispersion formed because a minor portion of the solvent is soluble in the copolymer but the bulk is not. The organic liquids may also have small amounts of paraffins or other solid hydrocarbons added to them. Hydrocarbon media having mainly non-aromatic constituents are preferred as organic liquids.

Organic liquids which are particularly preferred are pure aliphatic and hydroaromatic hydrocarbons and mixtures thereof with xylene, toluene and mixtures of xylene and ethylacetate, the proportion of aliphatic or hydroaromatic hydrocarbons predominating.

Coating agents according to this invention should be prepared by polymerization of the above mentioned monomers of the mixture (I) in the organic liquid in the presence of a copolymer (II) which is substantially compatible with the copolymer (I) and which is substantially, or preferably completely, soluble in the organic solvent used. The copolymer (II) is advantageously used in an amount of 10 to 200% and particularly 10 to 50% by weight with reference to the mixture of monomers (I).

As the copolymer (II), a copolymer is used which contains polymerized units of:

(A) 50 to 97% and particularly 60 to 90% by weight of at least one copolymerizable ester of a monoolefinically unsaturated carboxylic acid having three to five carbon atoms and an alcohol having four to eighteen carbon atoms;

(B) 2 to 50% and particularly 2 to 20% by weight of a N-methylolamide of an olefinically unsaturated carboxylic acid having three to five carbon atoms etherified with an alcohol having one to eight carbon atoms; and (C) 0.5 to 48% and preferably 5 to 25% by weight of at least one other copolymerizable monoolefinically unsaturated monomer.

(A) Suitable copolymerizable esters of monoolefinically unsaturated carboxylic acids having three to five carbon atoms with alcohols having four to eighteen carbon atoms are in particular the appropriate esters of acrylic acid and/or methacrylic acid such as the n-butyl, hexyl, octyl, lauryl, stearyl and preferably the 2-ethylhexyl esters. Examples of other suitable esters are the corresponding esters of maleic acid, fumaric acid or itaconic acid which are preferably used in admixture with acrylic or methacrylic esters. It is also possible to use esters of alcohols having one to three carbon atoms such as methyl, ethyl or propyl esters in minor amounts, but the number of carbon atoms of the alcohol radical of the sum of the esters should on an average amount to at least 4.

(B) The same etherified N-methylolamides of unsaturated carboxylic acids as serve for the production of copolymers from mixture (I) are also suitable in this case.

(C) Polymerized units of the following may be used as further olefinically unsaturated monomers in the copolymer (II): styrene and vinyltoluene, olefinically unsaturated monomers containing hydroxyl groups, particularly monesters of a polyhydric, preferably dihydric, alcohol having two to eight carbon atoms with an olefinically unsaturated carboxylic acid having three to five carbon atoms, particularly with acrylic or methacrylic acid, for example the monoacrylates and monomethacrylates of ethylene glycol, 1,2-propylene glycol, 1,3-propylene glycol, diethylene glycol, glycerol, trimethylolpropane and particularly 1,4-butanediol. These monomers containing hydroxyl groups are preferably contained in the copolymer in polymerized form in an amount of from 2 to 20% by weight. Copolymers (II) are also very suitable which contain polymerized units of olefinically unsaturated monomers containing carboxyl, amido, imido or amino groups, such as unsaturated carboxylic acids having three to five carbon atoms (preferably 0.5 to 10% by weight), as for example acrylic acid and methacrylic acid, their amides, for example acrylamide or methacrylamide, or preferably N-vinyl compounds such as N-vinylpyrrolidone, N-vinylcaprolactam, N-vinylsuccinimide or N-vinylimidazole. Mixtures of the said compounds are also suitable.

The total of the percentages of $(A)+(B)+(C)$ is 100.

Polymerization of the monomer mixture (I) is preferably carried out at a temperature of from about 60° to 100° C. Conventional initiators forming free radicals which initiate polymerization of the monomers at about 50° to 100° C., such as peroxides or azo compounds, for example benzoyl peroxide or azoisobutyronitrile, may be used for the polymerization. Obviously redox systems are also suitable.

The coating agents based on copolymers in accordance with this invention may be used alone or in combination with conventional heat-curable aminoplast precondensates particularly as baking enamels. Low molecular weight condensates of urea, melamine or benzoguanamine with formaldehyde are particularly suitable aminoplast precondensates. Formaldehyde condensates of urea, melamine and benzoguanamine which have been etherified with lower alkanols, especially n-butanol or isobutanol, are especially suitable. Examples of suitable condensates of this type are described in Ullmanns Encyklopädie der technischen Chemie, 3, 475 to 496 (1953). The content of such aminoplast precondensates should be from 5 to 40%, preferably from 15 to 30%, by weight with reference to the copolymer (I).

The coating agents according to this invention may also have added to them in minor amounts other conventional surface coating binders such as epoxy resins, phenol resins and/or alkyd resins. Conventional auxiliaries such as pigments, dyes, curing accelerators and agents for improving flow may also be added.

The coating agents are suitable for the production of surface coatings on wood, ceramic material and plastics but particularly metal, especially iron, aluminum, magnesium and alloys containing these metals. They are therefore suitable for example for the surface coating of household articles, automobile parts and medical apparatus. They may be applied by conventional methods such as dipping, pouring, spraying, brushing and rolling.

Curing of the copolymers, i.e. making of the surface coating agents according to this invention, is carried out at about 100° to 150° C. The baking period depends on the temperature used. Thus for example surface coatings having optimum properties are obtained in one hour at 150° C. Whereas the copolymers (II) obtained by solupolymerization generally have a mean molecular weight of from 2000 to 5000, the copolymers prepared as dispersions by the process according to this invention have a mean molecular weight of from 50,000 to 100,000.

It is a particular advantage of the process according to this invention that it permits the production of surface coatings which have considerably lower viscosity than copolymers of the same composition prepared by conventional solution polymerization although the content of binder and the degree of polymerization are increased according to this invention.

The invention is illustrated by the following examples. Parts and percentages specified in the examples are by weight unless otherwise stated.

EXAMPLE 1

38 parts of a 65% solution in a mixture (volumetric ratio 5:2) of xylene and ethyl acetate of a polymer (II) from 10 parts of 1,4-butanediol mono-acrylate, 5 parts of N-butoxymethylmethacrylamide and 85 parts of 2-ethylhexylacrylate is mixed with 70 parts of gasoline (boiling range 80° to 140° C.) and heated at 85° to 90° C. under nitrogen. Then while stirring 100 parts of a mixture consisting of 22.5 parts of 1,4-butanediol monoacrylate, 22.5 parts of N-butoxymethylmethacrylamide, 90 parts of methyl acrylate, 67.5 parts of ethyl acrylate, 22.5 parts of acrylonitrile, 285 parts of gasoline (boiling range from 80° to 140° C.) and 4.5 parts of azoisobutyronitrile is added. After the reaction has commenced, the remainder of the mixture (410 parts) is dripped in while stirring within ninety minutes. The solids content is 39.7% after a total reaction period of five hours.

27 parts of the dispersion which has been diluted with gasoline to a solids content of 30% is mixed with a mixture of 3.75 parts of a 55% solution in butanol of a melamine-formaldehyde condensate conventionally used for surface coating purposes, 0.2 part of p-toluenesulfonic acid is added and the product is applied to iron sheeting which is free from rust. Coatings are obtained which, after having been baked at 150° C. for one hour, have a pendulum hardness (according to DIN 53,157) of 134 seconds and an Erichsen value (DIN 53,156) of 10.

EXAMPLE 2

100 parts of a mixture consisting of 11.25 parts 1,4-butanediol monoacrylate, 22.5 parts of N-butoxymethylmethacrylamide, 101.25 parts of methyl acrylate, 45 parts of ethyl acrylate, 33.75 parts of acrylonitrile, 11.25 parts of vinyl acetate, 285 parts of gasoline (boiling range from 80° to 140° C.) and 4.5 parts of azoisobutyronitrile is added while stirring under nitrogen at 90° C. to a mixture consisting of 38 parts of a 65% solution in a mixture (volumetric ratio 5:2) of xylene and ethyl acetate of a polymer (II) from 85 parts of 2-ethylhexyl acrylate, 10 parts of 1,4-butanediol monoacrylate and 5 parts of N-butoxymethylmethacrylamide, and 70 parts of gasoline (boiling range from 80° to 140° C.). After the reaction has commenced the remainder of the mixture (410 parts) is dripped in slowly within ninety minutes. A mobile dispersion is formed having a solids content of 40%.

20 parts of the 40% dispersion is diluted with 7 parts of gasoline and mixed with a mixture consisting of 3.75 parts of a 55% solution in a mixture of xylene and n-butanol (volumetric ratio 1:1) of a melamine-formaldehyde condensate conventionally used for surface coating purposes and 4 parts of ethyl acetate. After 0.2 part of p-toluenesulfonic acid has been added, the mixture is brushed onto iron sheeting free from rust. The coating is baked for one hour at 150° C. and then has a pendulum hardness of 119 seconds (according to DIN 53,157) and an Erichsen value of 7.2 (according to DIN 53,156).

EXAMPLE 3

38 parts of a 65% solution in a mixture of xylene and ethyl acetate (volumetric ratio 5:2) of a polymer (II) consisting of 70 parts of 2-ethylhexyl acrylate, 15 parts of styrene, 10 parts of N-butoxymethylmethacrylamide and 5 parts of 1,4-butanediol monoacrylate is mixed with 70 parts of gasoline (boiling range from 80° to 140° C.) and heated under nitrogen at 85° to 90° C. Then while stirring 100 parts of a mixture consisting of 22.5 parts of N-butoxymethylmethacrylamide, 11.25 parts of 1,4-butanediol monoacrylate, 112.5 parts of methyl acrylate, 33.75 parts of acrylonitrile, 40.5 parts of ethyl acrylate, 2 parts of acrylic acid, 285 parts of gasoline and 4 parts of azoisobutyronitrile is added. After the reaction has commenced, the remainder of the mixture (410 parts) is dripped in the course of ninety minutes at a temperature of 85° to 90° C. while stirring. The solids content of the mobile dispersion obtained is 39.5% after a total reaction period of five hours.

20 parts of the 39.5% dispersion is diluted with 7 parts of gasoline and mixed with a mixture of 3.75 parts of a 55% solution in a mixture of xylene and butanol (volumetric ratio 1:1) of a melamine-formaldehyde condensate conventionally used for surface coating purposes and 4 parts of ethyl acetate and brushed onto rust-free metal sheeting. A surface coating is obtained which when cured for one hour at 150° C. has a pendulum hardness (DIN 53,157) of 102 seconds and an Erichsen value (DIN 53,156) of 7.5.

EXAMPLE 4

76 parts of a 65% solution in a mixture of xylene and ethyl acetate (volumetric ratio 5:2) of a polymer (II)

from 20 parts of styrene, 72 parts of 2-ethylhexyl acrylate, 3 parts of vinylimidazole and 5 parts of N-n-butoxymethylacrylamide is added to 710 parts of gasoline (boiling range from 80° to 140° C.). After 345 parts of ethyl acrylate, 68 parts of N-n-butoxymethylmethacrylamide, 27 parts of 1,4-butanediol monoacrylate, 9 parts of acrylic acid and 9 parts of benzoyl peroxide have been added, the mixture is heated at 77° to 80° C. for about one hour while stirring. A mobile dispersion of the copolymer (I) is obtained.

Some of the dispersion is applied to a sheet of glass and to rust-free metal sheeting and the film is heated for two hours at 150° C. in the presence of p-toluenesulfonic acid. A clear film very resistant to mechanical stress is obtained which is extremely resistant to water and organic solvents.

EXAMPLES 5 TO 7

The procedure of Example 4 is followed but 449 parts of one of the following monomer mixtures is used:

Example 5

|  | Percent |
| --- | --- |
| Ethyl acrylate | 62 |
| Acrylonitrile | 15 |
| 1,4-butanediol monoacrylate | 6 |
| Acrylic acid | 2 |
| N-n-butoxymethylmethacrylamide | 15 |

Example 6

| | |
| --- | --- |
| Methyl methacrylate | 15 |
| Ethyl acrylate | 62 |
| 1,4-butanediol monoacrylate | 6 |
| Acrylic acid | 2 |
| N-n-butoxymethylmethacrylamide | 15 |

Example 7

| | |
| --- | --- |
| Acrylonitrile | 10 |
| Ethyl acrylate | 67 |
| Acrylic acid | 2 |
| 1,4-butanediol monoacrylate | 6 |
| N-n-butoxymethylmethacrylamide | 15 |

The copolymer dispersions obtained give coatings which after baking at 150° to 170° C. are waterproof and insoluble in solvents.

EXAMPLE 8

41.3 parts of an 80% solution in xylene of a polymer (II) from 40 parts of styrene, 144 parts of 2-ethylhexyl acrylate, 6 parts of vinylimidazole and 10 parts of N-n-butoxymethylmethacrylamide are added to 473 parts of gasoline (boiling range from 80° to 140° C.) and then 108 parts of n-butyl acrylate, 140 parts of ethyl acrylate, 6 parts of acrylic acid, 45.3 parts of N-n-butoxymethylmethacrylamide and 6 parts of benzoyl peroxide are dissolved therein. 135 parts of the mixture is placed in a stirred flask fitted with a dropping funnel, stirrer and thermometer and heated to 80° C. The remainder of the above mixture is introduced into the stirred vessel in the course of one hour. After all has been run in, polymerization is allowed to continue at 80° C. for another two hours. A stable dispersion is obtained having a solids content of 40% from which, after the solvent has evaporated, an elastic film is obtained which is extremely waterproof.

EXAMPLE 9

A mixture of 30 parts of ethyl acrylate, 40 parts of methyl acrylate, 10 parts of N-propoxymethyl methacrylamide, 10 parts of acrylonitrile, 10 parts of butanediol monoacrylate and 2 parts of benzoyl peroxide is added within ninety minutes under nitrogen at about 85° C. while stirring to a 45% solution of a copolymer from 85 parts of 2-ethylhexyl acrylate, 5 parts of N-butoxymethylmethacrylamide, 5 parts of styrene and 5 parts of butanediol monoacrylate in gasoline having a boiling range of from 155° to 185° C. (which has a viscosity of 27 seconds measured by determining the efflux time in a DIN cup 4 according to DIN 53211) and the whole is heated for about one hour at about 80° C. A dispersion is obtained which has a solids content of 48.3% and a viscosity of 24 seconds (cup 4 according to DIN 53,211). If this dispersion is converted by adding a mixture (1:1) of butanol and acetone into a solution having a solids content of 24%, this 24% solution has a viscosity of 23.8 seconds (cup 4 according to DIN 53,211). If a copolymer mixture is prepared having the above composition by solution polymerization, a highly viscous solution is obtained having a clearly lower degree of polymerization.

EXAMPLE 10

A copolymer of 53 parts of hexyl acrylate, 5 parts of 1,3-propylene glycol monoacrylic ester, 15 parts of N-hexoxymethylacrylamide, 25 parts of vinyltoluene, 0.5 part of acrylic acid and 1.5 parts of methacrylamide is dissolved in a mixture of (1:1:3) of ethyl acetate, toluene and gasoline to make a 50% solution. 300 parts of this solution mixture is diluted with 200 parts of gasoline (boiling range 80° to 140° C.) under nitrogen, heated to about 85° C. and a mixture of 60 parts of methyl methacrylate, 2 parts of N-methoxymethylacrylamide, 10 parts of vinyltoluene, 5 parts of methacrylamide, 2 parts of methacrylic acid, 10 parts of ethylene glycol monomethyacrylate and 11 parts of methacrylonitrile and also 2 parts of azo-bis-isobutyronitrile are added within one hour. About four hours later the polymerization is over. The mobile dispersion thus formed has a solids content of 41%.

EXAMPLE 11

A mixture of 65 part of ethyl acrylate, 20 parts of methyl acrylate, 5 parts of N-ethoxymethylacrylamide, 2.5 parts of vinylpyrrolidone, 5 parts of vinyl pivalate and 2.5 parts of diethylene glycol monoacrylate and a solution of 3 parts of azoisobutyronitrile in 40 parts of cyclohexane is added within three hours while stirring at from 80° to 85° C. under nitrogen to a viscous solution of a copolymer from 95 parts of octadecyl acrylate, 2.5 parts of N-butoxymethylmethacrylamide and 2.5 parts of 1,6-hexanediol monoacrylate in 40 parts of gasoline (boiling range from 130° to 150° C.). Five hours later polymerization is over. A readily flowable dispersion is obtained which has a solids content of 70.5%.

EXAMPLE 12

30 parts of a 50% solution of a copolymer from 60 parts of dodecyl acrylate, 20 parts of N-octoxymethylmethacrylamide, 10 parts of diethylene glycol monomethacrylate and 10 parts of vinylpyrrolidone in a mixture (4:1) of cyclohexane and xylene is diluted with 90 parts of cyclohexane in a stirred vessel which is capable of being heated, heated to about 80° C. and a mixture of 40 parts of methyl acrylate, 20 parts of isobutyl acrylate, 20 parts of N-butoxymethylmethacrylate, 10 parts of propylene glycol monomethacrylate, 5 parts of acrylonitrile and 5 parts of vinylimidazole and also 1.5 parts of benzoyl peroxide are added within about one hour. About four hours later the polymerization is over. A readily flowable dispersion is obtained having a solids content of 51.5%.

We claim:
1. A process for the production of surface coating agents based on copolymers containing etherified N-methylolamide groups wherein a *mixture* (I) of:
 (A) 50 to 95% by weight of at least one copolymerizable ester of a monoolefinically unsaturated carboxylic acid having three to five carbon atoms and an alcohol having one to four carbon atoms,
 (B) 0.75 to 25% by weight of an N-methylolamide of a copolymerizable olefinically unsaturated carboxylic acid having three to five carbon atoms which hase been etherified wit han alcohol having one to eight carbon atoms, and (C) 0.5 to 40% by weight of at least one further copolymerizable monoolefinically unsaturated monomers from the group of vinyl esters of monocarboxylic acids having two to eleven carbon atoms, of styrene, of vinyltoluene, of acrylic acid, of methacrylic acid, of acrylamide, of methacrylamide, of acrylonitrile, of methacrylonitrile, of the hemiester of an alkanediol or oxaalkanediol having two to six carbon atoms with acrylic acid or methacrylic acid, of a N-vinylimidazole and N-vinylpyrrolidone, the sum of the percentages of $(A)+(B)+(C)$ being 100, is polymerized under conventional conditions in an organic liquid which contains dissolved therein an amount of from 10 to 200% by weight with reference to the mixture (I) of a *copolymer (II)*, not identical to mixture (I), which contains polymerized units of:

(A) 50 to 97% by weight of a copolymerizable ester of a monoolefinically unsaturated carboxylic acid having three to five carbon atoms and an alcohol having four to eighteen carbon atoms, (B) 2 to 50% by weight of an N-methylolamide of a copolymerizable olefinically unsaturated carboxylic acid having three to five carbon atoms which has been etherified with an alcohol having one to eight carbon atoms, and (C) 0.5 to 48% by weight of at least one other copolymerizable monoolefinically unsaturated monomer from the group styrene, vinyltoluene, acrylic acid, methacrylic acid, acrylamide, methacrylamide, monoesters of acrylic or methacrylic acid with alkanediols or alkanetriols having two to six carbon atoms, N-vinylpyrrolidone and N-vinylimidazole, the sum of the percentages $(A)+(B)+(C)$ being 100, in the presence of a conventional initiator which forms free radicals under conventional polymerization conditions, the organic liquid containing at least 20% by weight of aliphatic or hydroaromatic hydrocarbons and the ratio of the sum of the weights of mixture (I) and copolymer (II) to the weight of the organic liquid being within the range from 1:4 to 4:1.

2. A process as claimed in claim 1 wherein the mixture (I) contains: 60 to 85% by weight of competent (A); 2.5 to 17.5% by weight of component (B); and 0.5 to 25% by weight of component (C) and the copolymer (II) contains polymerized units of: 60 to 90% by weight of component (A); 2 to 20% by weight of component (B); and 5 to 25% by weight of component (C).

3. A process as claimed in claim 1, wherein an aliphatic or hydroaromatic hydrocarbon or a mixture of the same with xylene is used as the organic liquid.

4. A process as claimed in claim 1, wherein a mixture of an aliphatic or hydroaromatic hydrocarbon, xylene and ethyl acetate is used as the organic liquid.

5. A proces as claimed in claim 1, wherein the mixture (I) contains: ethyl acrylate and methyl acrylate or methacrylate as component (A); N-butoxymethylacrylamide or N-butoxymethylmethacrylamide as component (B); and butane diolmonoacrylate and acrylonitrile as component (C); and the copolymer (II) contains: 2-ethylhexyl acrylate as component (A); N-butoxymethylacrylamide or N-butoxymethylmethacrylamide as component (B); and butanediol monoacrylate and styrene as component (C).

6. A process as claimed in claim 2, wherein the mixture (I) contains: ethyl acrylate and methyl acrylate or methacrylate as component (A); N-butoxymethylacrylamide or N-butoxymethylmethacrylamide as component (B); and butanediolmonoacrylate and acrylonitrile as component (C); and the copolymer (II) contains: 2-ethylhexyl acrylate as component (A); N-butoxymethylacrylamide or N-butoxymethylmethacrylamide as component (B); and butanediol monoacrylate and styrene as component (C).

References Cited

FOREIGN PATENTS 1,062,286   3/1967   Great Britain

SAMUEL H. BLECH, Primary Examiner

R. J. SEIBERT, Assistant Examiner

U.S. Cl. X.R.

117—123, 132, 138.8, 148, 161; 260—31.2, 32.8, 33.2, 33.6, 80.8, 80.72, 80.73, 80.75, 80.76, 80.81, 836, 844, 851, 856, 873, 882, 883, 885

PO-1050
(5/69)

UNITED STATES PATENT OFFICE
CERTIFICATE OF CORRECTION

Patent No. 3,551,525            Dated December 29, 1970

Inventor(s) Hans Wilhelm et al

It is certified that error appears in the above-identified patent and that said Letters Patent are hereby corrected as shown below:

Column 4, line 58, "monesters" should read -- monoesters --.

Column 8, line 27, "monomethy-" should read -- monometh- --.

Column 9, line 1, Claim 1, "hase been etherified wit han" should read -- has been etherified with an --; line 46, Claim "competent" should read -- component --.

Column 10, line 13, Claim 5, "proces" should read -- process .

Signed and sealed this 18th day of May 1971.

(SEAL)
Attest:

EDWARD M. FLETCHER, JR.          WILLIAM E. SCHUYLER, JR.
Attesting Officer                 Commissioner of Patents